United States Patent [19]

Hirata et al.

[11] Patent Number: 5,727,149
[45] Date of Patent: Mar. 10, 1998

[54] NETWORK INTERFACE APPARATUS AND DATA TRANSMISSION CONTROL METHOD THEREOF

[75] Inventors: Tetsuhiko Hirata; Minoru Koizumi, both of Yokohama; Emiko Yanagisawa, Kawasaki; Osamu Takada, Sagamihara; Hiroshi Wataya, Hitachinaka, all of Japan

[73] Assignee: Hitachi, Ltd., Tokyo, Japan

[21] Appl. No.: 576,336

[22] Filed: Dec. 21, 1995

[30] Foreign Application Priority Data

Dec. 22, 1994 [JP] Japan ................. 6-319776

[51] Int. Cl.⁶ .................................. G06F 13/372
[52] U.S. Cl. .................................. 395/200.8
[58] Field of Search ............... 364/DIG. 1, DIG. 2; 395/200.01, 200.02, 200.06, 200.1, 200.11, 200.8, 680, 821, 840, 851, 852

[56] References Cited

U.S. PATENT DOCUMENTS 5,544,324  8/1996  Eden et al. ................. 395/200.17
5,650,997  7/1997  Yang et al. ................. 370/448

*Primary Examiner*—Robert B. Harrell
*Attorney, Agent, or Firm*—Antonelli, Terry, Stout, & Kraus, LLP

[57] ABSTRACT

A network interface apparatus connected between a LAN adaptor possessed by a computer and a transceiver provided on a network includes a buffer memory for storing data, a first control circuit for communicating with the LAN adaptor, a second control circuit for communicating with the transceiver, and a processor for controlling the first and second control circuits to control the transfer of data between the LAN adaptor and the transceiver. The processor causes the buffer memory to store transmit data transmitted from the LAN adaptor and transmits the stored transmit data in the buffer memory to the transceiver in a transmission time zone which is allotted beforehand. The transmission time zone is determined by the processor on the basis of the reception of a synchronizing packet which is transferred on the network. Receive data received from the transceiver is selected by the processor so that only the selected receive data is sent to the LAN adaptor. A reference for the selection may include a protocol type, a port number on TCP/IP or the like.

26 Claims, 14 Drawing Sheets

NETWORK INTERFACE APPARATUS AND DATA TRANSMISSION CONTROL METHOD THEREOF

CROSS-REFERENCE TO RELATED APPLICATION

The present application relates to a copending U.S application Ser. No 08/355,682, filed on Dec. 14, 1994 entitled "DISTRIBUTED SYSTEM AND DATA TRANSMISSION CONTROL METHOD" by Emiko Yanagisawa et al. and assigned to the present assignee, the contents of which are incorporated herein by reference.

BACKGROUND OF THE INVENTION

The present invention relates to an information communication network and a network interface in which a random medium access system is used, and more particularly to a computer network system in which information is communicated between a plurality of computers through broadcast data and a network interface which is applied between each computer and a network.

Ethernet, which is a name for a local area network devised by Xerox PARC at the beginning of the 1970's, has come into wide use as a standard network in the business world of computer network. A typical medium for the Ethernet is a coaxial cable of ½ inch diameter. The cable can be extended up to about 500 m.

In the conventional system, the connection of a computer to Ethernet is made through a transceiver provided on a transmission line and a LAN (Local Area Network) adaptor connected to a system bus of each computer (which may include a personal computer, a work station having a data processor incorporated therein, a terminal device or the like). The transceiver has a detection function of detecting whether or not the Ethernet is being used and a translation function of making a translation between an analog signal which flows on the Ethernet and a digital signal which is handled by each computer. The transceiver and the LAN adaptor are connected by a cable which is called transceiver cable.

The Ethernet is a broadcast bus of 10 Mbps which has a distributed access control function. All packets flowing on the transmission line are delivered from each transceiver on the Ethernet to the LAN adaptor. On the basis of the address of the receive packet, the LAN adaptor judges whether or not the data of the receive packet is to be delivered to its own computer. As the result of judgement, the LAN adaptor performs a processing for relaying necessary data and discarding unnecessary data.

In order to judge whether or not the network is vacant, the Ethernet uses a CSMA (Carrier Sense Multiple Access) system in which a carrier wave on the transmission line is detected prior to the transmission of data from each computer. Confirming that the transmission line is in a vacant condition, each transceiver starts a data transmission operation. Since signals transmitted from the transceivers cannot simultaneously reach all locations of the network, there may be a possibility that when a plurality of computers making the judgement of the network as being vacant start their data transmission operations, a plurality of transmitted data collide with each other on the transmission line. Each transceiver on the Ethernet is provided with a CS (Collision Detection) function of monitoring the collision of data on the transmission line and causing the LAN adaptor to stop the transmission of data upon detection of the data collision so that the transmission of data is tried again after having a wait for the idle condition of the network in accordance with a predetermined algorithm (or binary exponential backoff algorithm).

With the use of the CSMA system and the CS function mentioned above, the Ethernet can perform a medium access control without centralizing a special function for network transmission right (or bid) control onto a specified computer and without using a special signal for transmission right control as in a token passing system.

The LAN adaptor for Ethernet has an addressing mechanism with which unnecessary data is not relayed to the computer. This is known as an Ethernet address of 48 bits. The Ethernet address includes an address for specifying the LAN adaptor uniquely and a broadcast address for sending data to all stations. The addition of the broadcast address to transmit data makes it possible for a transmitting device to distribute data to all computers of the network through a data transmission operation performed once.

For detailed description of the Ethernet, one can refer to, for example, Work Station Series, Local Area Network "Introduction To Ethernet" written by Akihiro Uetani et al. and published by Maruzen Kabushiki-kaisha on Dec. 10, 1985.

In the conventional network, there is employed the Ethernet uses a control system in which a re-transmission operation copes with the generation of data collision at the time of trial of data transmission. Therefore, in the case where no collision is generated, it is possible to send data to a receiver after a short waiting time. However, in the case where the collision is generated once, there is a problem that an upper limit value cannot be ensured for a time required for data transmission. Namely, if the collision of data is repeated, a waiting time for data re-transmission is increased in a binary exponential form. Accordingly, when the possibility of collision of re-transmit data is taken into consideration, it is impossible to ensure the completion of data transmission within a predetermined time. Also, it is not ensured that a chance of data transmission is given in order from a device which earlier starts to wait for the idle condition of the network.

In the case where seen from a receiving side, a problem is generated if data transmission by broadcast is frequently used. Namely, when the broadcast data is received, a LAN adaptor issues a receiving interruption to its own computer to transfer the data irrespective of whether or not the computer needs the data. Therefore, a load for data reception processing at each computer is increased. Therefore, for example, a computer having a low processing ability may bring about a situation in which the computer consumes the most of the ability of the CPU for a communication processing and cannot perform the other data processing operation.

There may be considered a system in which an on-board microcomputer is provided on a LAN adaptor so that a communication processing is performed on the LAN adaptor board. However, it is general that a LAN adaptor itself has a tendency to become low in cost and compact in size and an Ethernet medium access processing function is the utmost which can be provided on the board of a general-purpose LAN adaptor. Also, it is not easy to substitute an adaptor with the abovementioned special function for a LAN adaptor having already been placed into an operating condition and to make a change to a driver software of the operating LAN adaptor.

SUMMARY OF THE INVENTION

In the field of a computer control system, there is generally used a method in which, for example, plant data supplied from a controller is given to a controlling computer through broadcast. In the case where such a system is structured using the Ethernet, the assurance of an upper limit value for the plant data transmission delay time and a reduction in load for broadcast data reception processing are very important technical tasks.

An object of the present invention is to provide a computer network system and a network interface in which a pre-ensured band can be given to each computer in regard to a data transmission delay time.

Another object of the present invention is to provide a computer network system and a network interface in which a load for broadcast data reception processing is reduced to enable the effective use of the computer resource to another data processing.

A further object of the present invention is to provide a computer network system and a network interface in which Ethernet can particularly be used and each computer can effectively perform a processing for transmission and reception of data to and from a network.

To that end, in a preferred embodiment of the present invention, a network interface apparatus including a microprocessor and a buffer memory is arranged between each of LAN adaptors respectively connected to computers and a connecting device provided on a network. Transmit data transmitted from the LAN adaptor to the network is stored in the buffer memory of the network interface apparatus once and the network interface sends the transmit data to a transmission line in a transmission time zone which is allotted to each computer beforehand.

In order that each computer recognizes a transmission time zone allotted to itself, a synchronizing packet is issued for each cycle by any computer, for example, that one of plural computers connected to the network which is allotted with the first transmission time zone of each data transmission cycle. Each of the other computers determines a transmission time zone for that computer by a timer with the point of time of reception of the synchronizing packet taken as a starting point. In according with the precision of the timer, there may be employed a method in which the synchronizing packet is issued once at the start of the system and subsequently each computer periodically determines its data transmission time zone by its own timer.

It is preferable that the network interface apparatus includes means for selectively transmitting a pseudo carrier to the LAN adaptor. In the case where a buffer for transmission has no vacancy or in the case where the vacant area of the transmission buffer becomes equal to or smaller than a predetermined threshold, the network interface apparatus transmits the pseudo carrier to suppress the transmission of data by the DAN adaptor in a manner similar to that in the case where the transmission line is busy.

Further, the network interface apparatus has a function of filtering receive data. With this function, the network interface apparatus performs a processing of relaying only that one of data received from the network transmission line which the computer needs and discarding unnecessary data.

Another embodiment of the present invention is such that in a computer network system in which a plurality of computers each having a LAN adaptor are interconnected by Ethernet, the LAN adaptor of each computer is connected to a network interface apparatus through a first cable and the network interface apparatus is connected to a transceiver of an Ethernet transmission line through a second cable. It is preferable that each network interface apparatus suppresses the transmission of data from the LAN adaptor by transmitting a pseudo carrier to the first cable and permits the data transmission from the LAN adaptor by stopping the transmission of the pseudo carrier.

In another aspect of a computer network system according to the present invention, each network interface apparatus makes, in a cyclically coming specific data transmission period, the storage of data received from the first cable into a buffer memory or the transmission of transmit data read from the buffer memory to the second cable. In a period other than the data transmission period, the network interface apparatus makes the storage of data received from the first cable into the buffer memory or the transmission of data received from the second cable to the first cable.

According to the present invention, data randomly transmitted to a network through a LAN adaptor is stored once into a buffer Of a network interface apparatus and the transmission of data to a network transmission line is started after a wait for the coming of a transmission time zone allotted beforehand, thereby avoiding a danger of transmit data from a plurality of computers from colliding with each other on the transmission line. With this construction, since computers are scheduled in regard to the order of data transmission, there is eliminated a re-transmission operation which is otherwise caused from the collision of data on the transmission. Further, since it is possible to avoid a situation in which one computer occupies the transmission line, a chance of data transmission can be ensured periodically for each computer.

Also, in order to store transmit data from the LAN adaptor in the network interface apparatus during a period of time when the transmission time zone comes, it is necessary to provide a buffer which has a proper capacity. However, the preparation of a buffer having a large capacity as compared with the amount of data capable of being transmitted is not advisable since the amount of data capable of being transmitted to the network in an allotted transmission time zone is limited. In the present invention, a pseudo carrier is transmitted from the network interface apparatus to the LAN adaptor at the point of time when the remainder of a vacant buffer reaches a threshold. When seeing from the LAN adaptor, it seems that the flow control of transmit data is performed as if the network was placed in a busy condition. Thereby, it is possible to suppress the capacity of a buffer memory required by the network interface apparatus to a proper capacity.

Further, the network interface apparatus receives unicast data or broadcast data from the network transmission line and performs a filtering process on the basis of information such as a socket number of a receive packet to selectively relay only data which the computer needs. Thereby, it is possible to reduce a load of each computer for a reception processing.

BRIEF DESCRIPTION OF THE PREFERRED EMBODIMENTS

DESCRIPTION OF THE PREFERRED EMBODIMENTS

Figure 1:
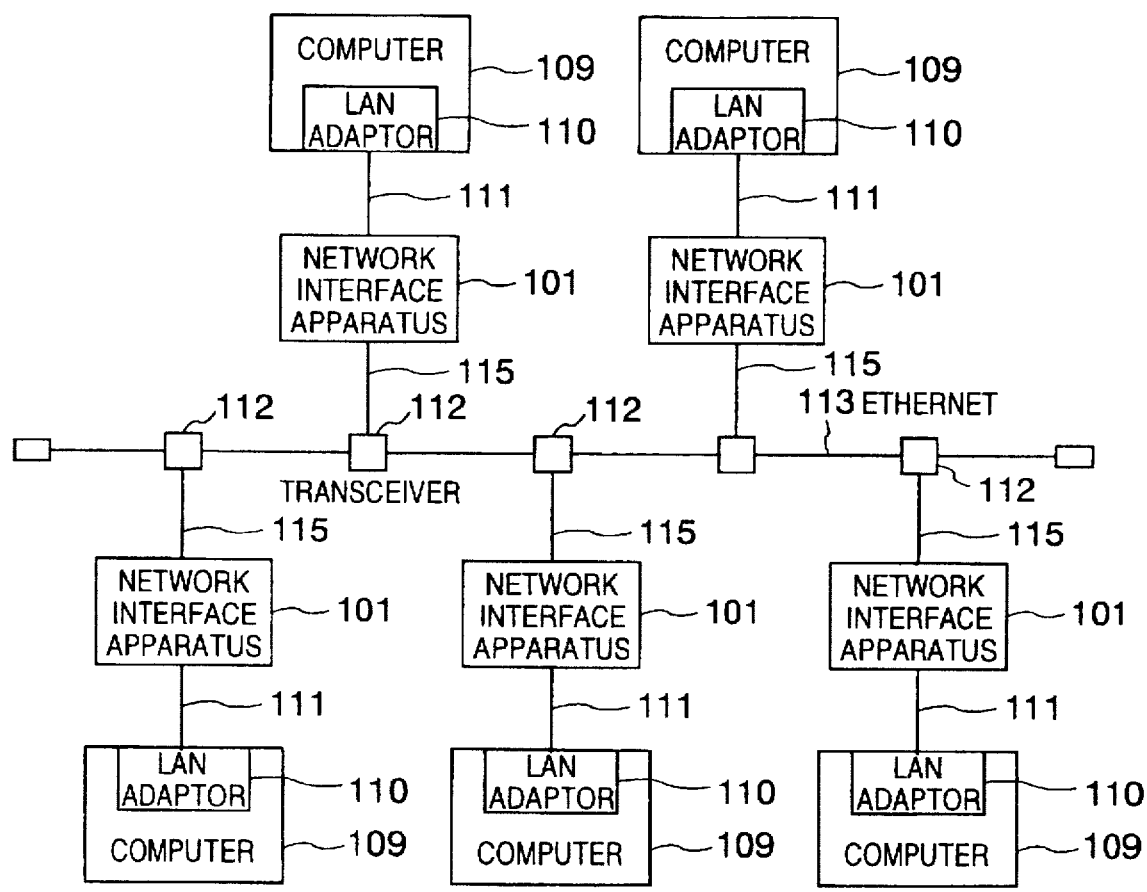
FIG. 1 is a block diagram showing an example of a network system to which a network interface apparatus according to the present invention is applied.

FIG. 1 is a block diagram showing an example of the construction of a network system to which a network interface apparatus according to the present invention is applied.

This network system includes a plurality of end systems (work stations or terminal devices) each of which is composed of a computer 109 and a LAN adaptor 110. Each end system is connected to a network interface apparatus 101 through a transceiver cable 111. The network interface apparatus 101 is connected to a transceiver 112 on an Ethernet transmission line 113 through a transceiver cable 115.

Figure 2:
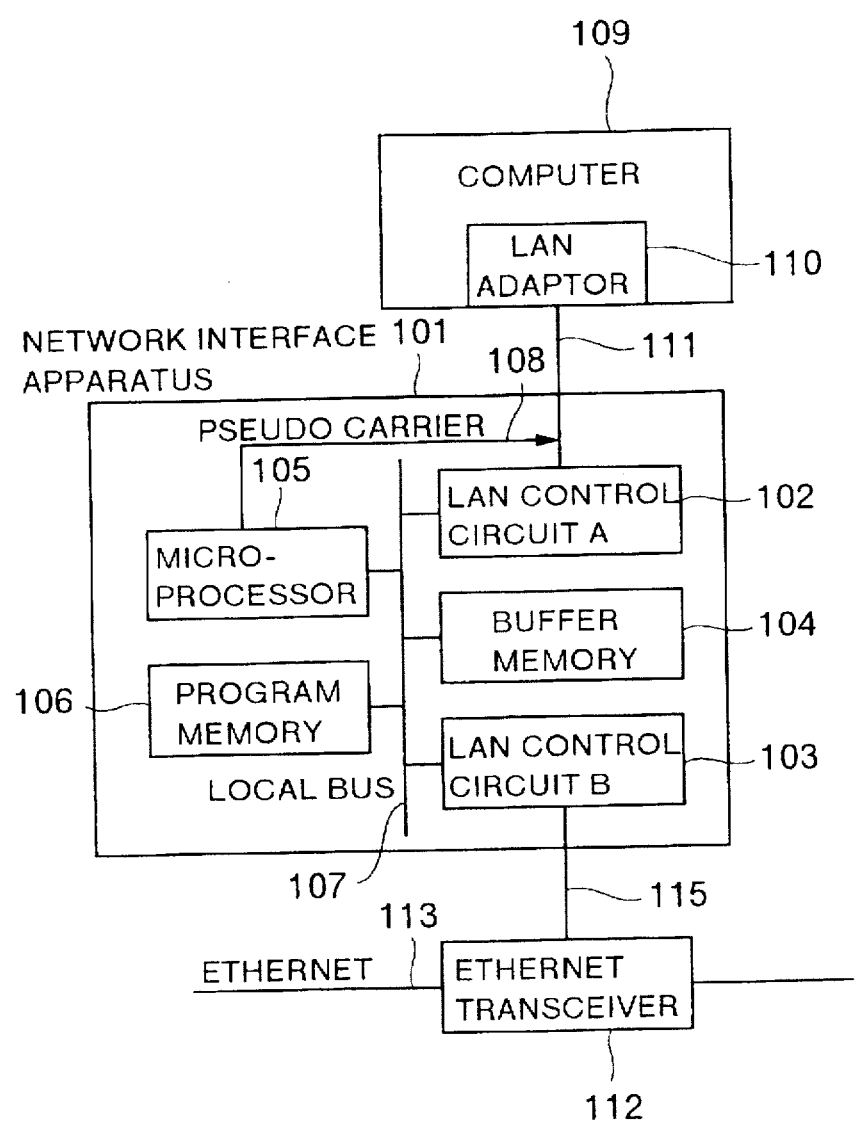
FIG. 2 is a block diagram showing an example of the construction of the network interface apparatus.

FIG. 2 is a block diagram showing an example of the detailed construction of the network interface apparatus 101.

The network interface apparatus 101 includes a first LAN control circuit 102 (or LAN control circuit A) for making the transmission and reception of data to and from the LAN adaptor 110, a second LAN control circuit 103 (or LAN control circuit B) for making the transmission and reception of data to and from the Ethernet transmission line 113, a buffer memory 104 for storing data in both an upward direction (from the transceiver 112 to the LAN adaptor 110) and a down direction (from the LAN adaptor 110 to the transceiver 112), a microprocessor 105 for making a control in the network interface apparatus 101, and a program memory 106 for storing programs which operate the microprocessor 105. In the program memory 106 is also stored a filtering parameter table to which the reference is made when receive data is to be filtered. The above components are interconnected by a local bus 107. The microprocessor 105 is provided with means for usually generating to the LAN adaptor 110 a pseudo carrier 108 similar to a carrier which is generated by the transceiver 112 on the Ethernet transmission line 113 and indicates that the Ethernet transmission line is being used.

Figure 3:
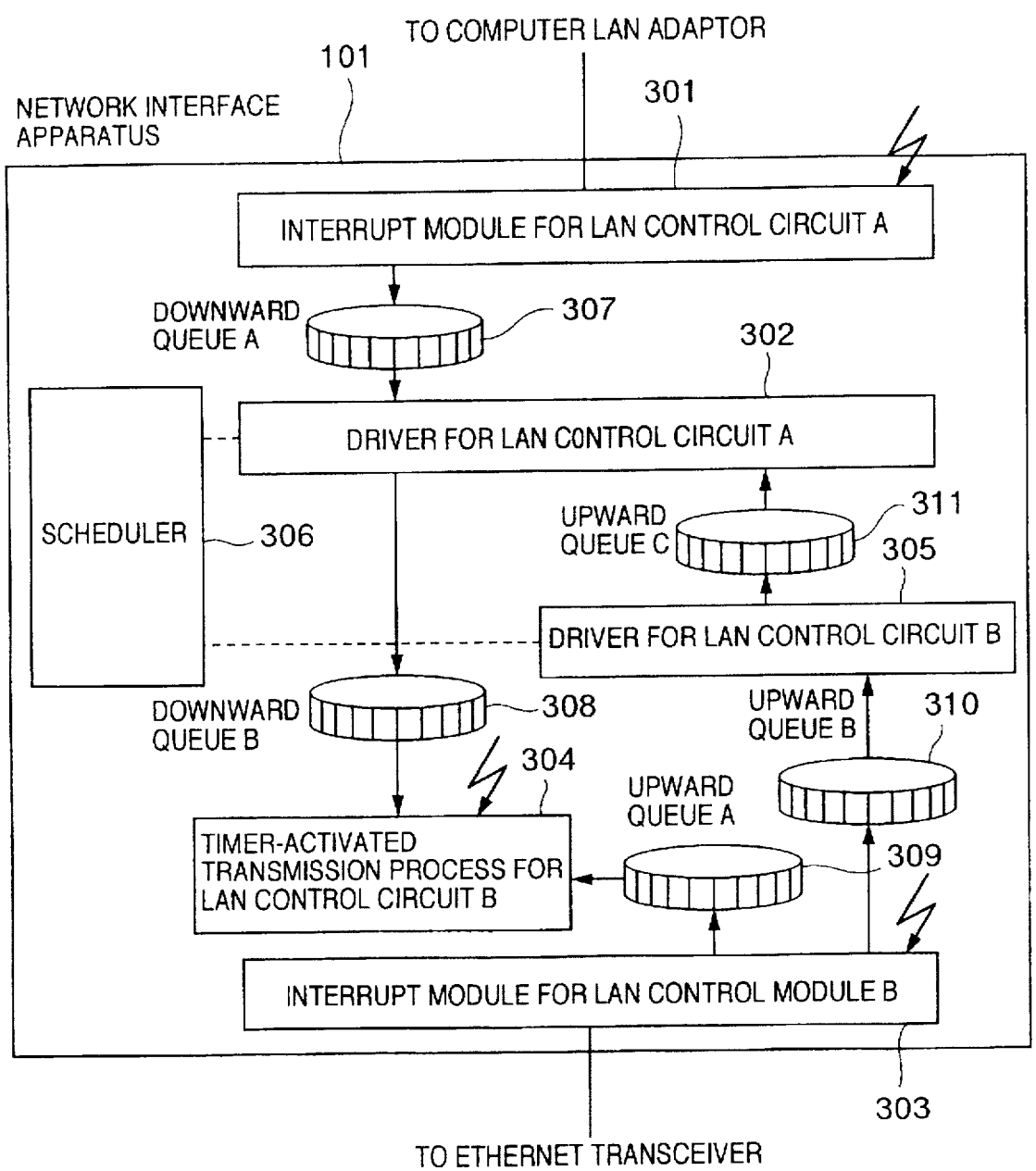
FIG. 3 is a block diagram showing the construction of an example of a software with which the network interface apparatus is provided.

FIG. 3 shows the construction of a software of the network interface apparatus 101.

Programs include an interrupt module (or routine) 301 for the LAN control circuit A, a driver 302 for the LAN control circuit A, an interrupt module 303 for the LAN control circuit B, a timer-activated transmission process 304 for the LAN control circuit B, a driver 305 for the LAN control circuit B, and a scheduler 306. These programs are stored in the program memory 106 and are executed by the microprocessor 105. The microprocessor 105 properly executes those programs to realize various controls. A first downward queue 307 (or downward queue A) is provided between the interrupt module 301 for the LAN control circuit A and the driver 302 for the LAN control circuit A. A second downward queue 308 (or downward queue B) is provided between the driver 302 for the LAN control circuit A and the timer-activated transmission process 304 for the LAN control circuit B. A first upward queue 309 (or upward queue A) is provided between the interrupt module 303 for the LAN control circuit B and the timer-activated transmission process 304 for the LAN control circuit B. A second upward queue 310 (or upward queue B) is provided between the interrupt module 303 for the LAN control circuit B and the driver 305 for the LAN control circuit B. A third upward queue 311 (or downward queue C) is provided between the driver 305 for the LAN control circuit B and the driver 302 for the LAN control circuit A.

The programs will be explained using flow charts shown in FIGS. 4 to 7, 9 and 10.

Figure 4:
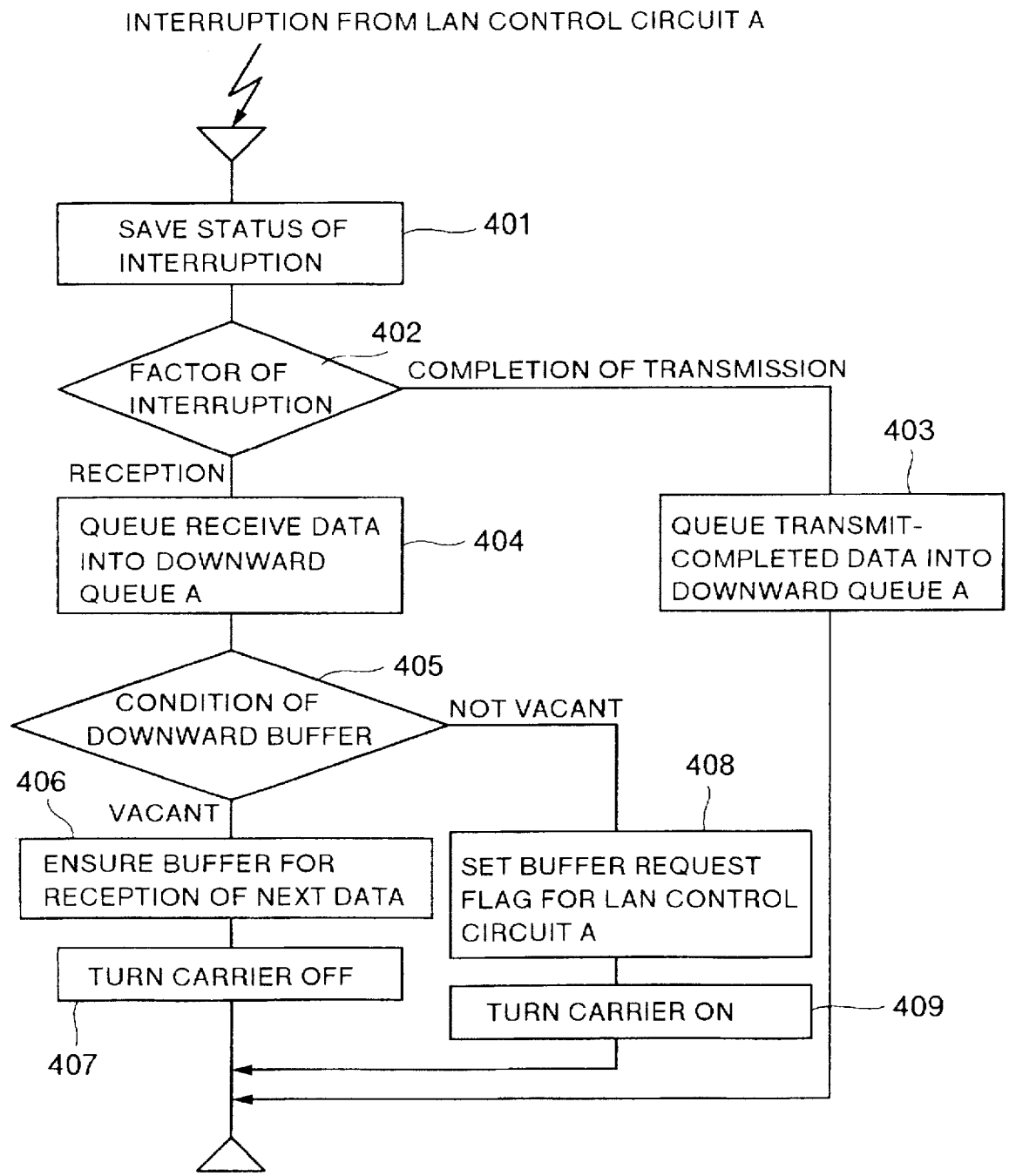
FIG. 4 is a flow chart showing a processing performed by a module which processes an interruption from a first LAN control circuit.

FIG. 4 is a flow chart of a processing performed by the interrupt module 301 for the LAN control circuit A. The microprocessor 105 executes the interrupt module 301 when there is an interruption from the LAN control circuit A 102. The microprocessor 105 saves the status of interruption (step 401) and thereafter judges a factor of interruption (step 402). In the case of an interruption indicating the completion of transmission to the LAN adaptor 110 side, transmit-completed data is queued into the downward queue A 307 (step 403), thereby completing this routine. In the case of a receiving interruption, receive data is queued into the downward queue A 307 (step 404) and the condition of vacancy of a downward buffer is thereafter checked in preparation for reception of the next data (step 405). Usually, there is a vacancy in the buffer. In this case, a buffer area for reception is ensured (step 406) and a pseudo carrier is turned into an OFF condition (step 407). In the case where there is much traffic in the downward direction so that the downward buffer has no vacancy, a buffer request flag for the LAN control circuit A 102 is set or turned on (step 408) and the pseudo carrier is turned into an ON condition (step 409).

Figure 5:
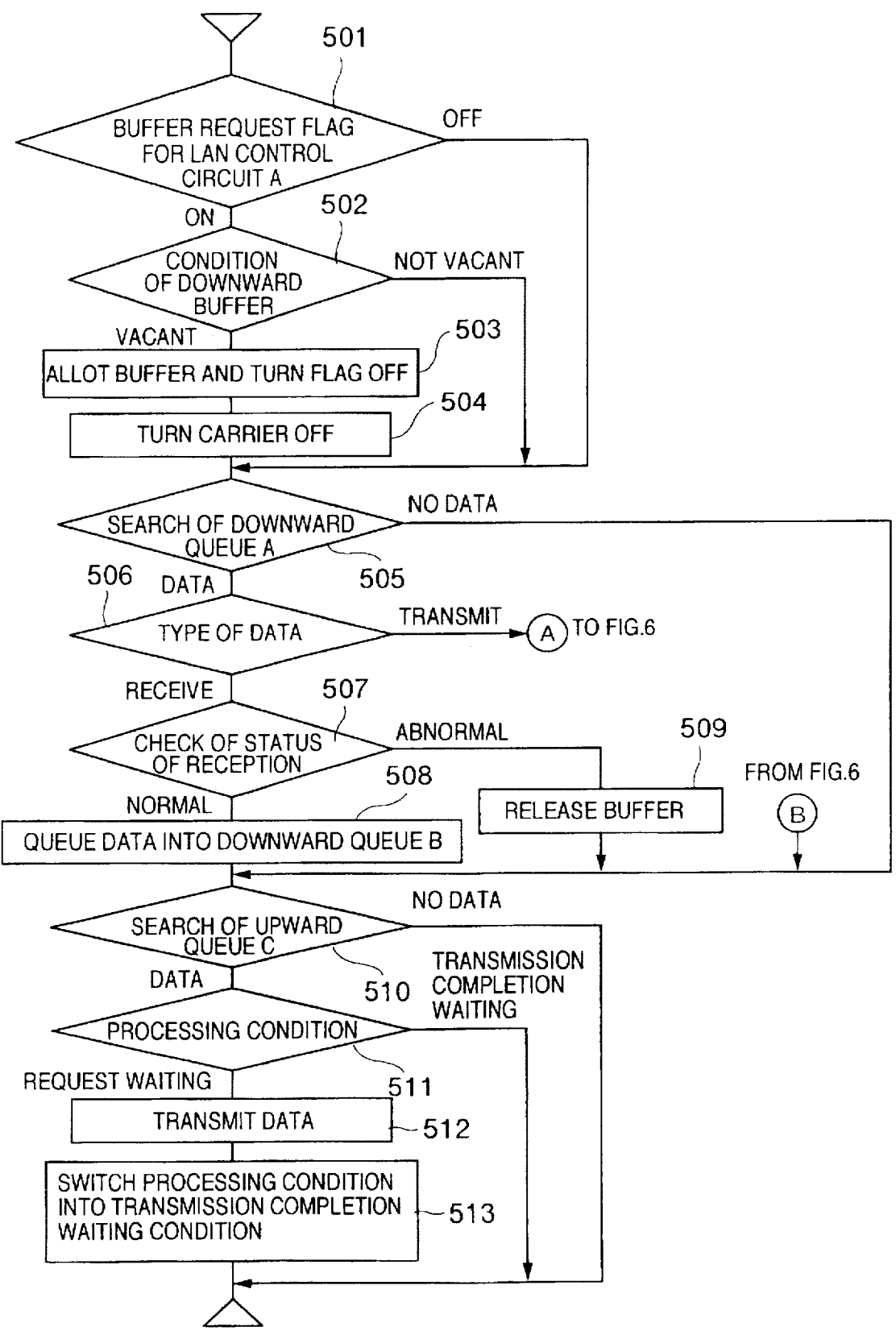
FIGS. 5 and 6 shows as a whole a flow chart of a processing performed by a first LAN control driver.
Figure 6:
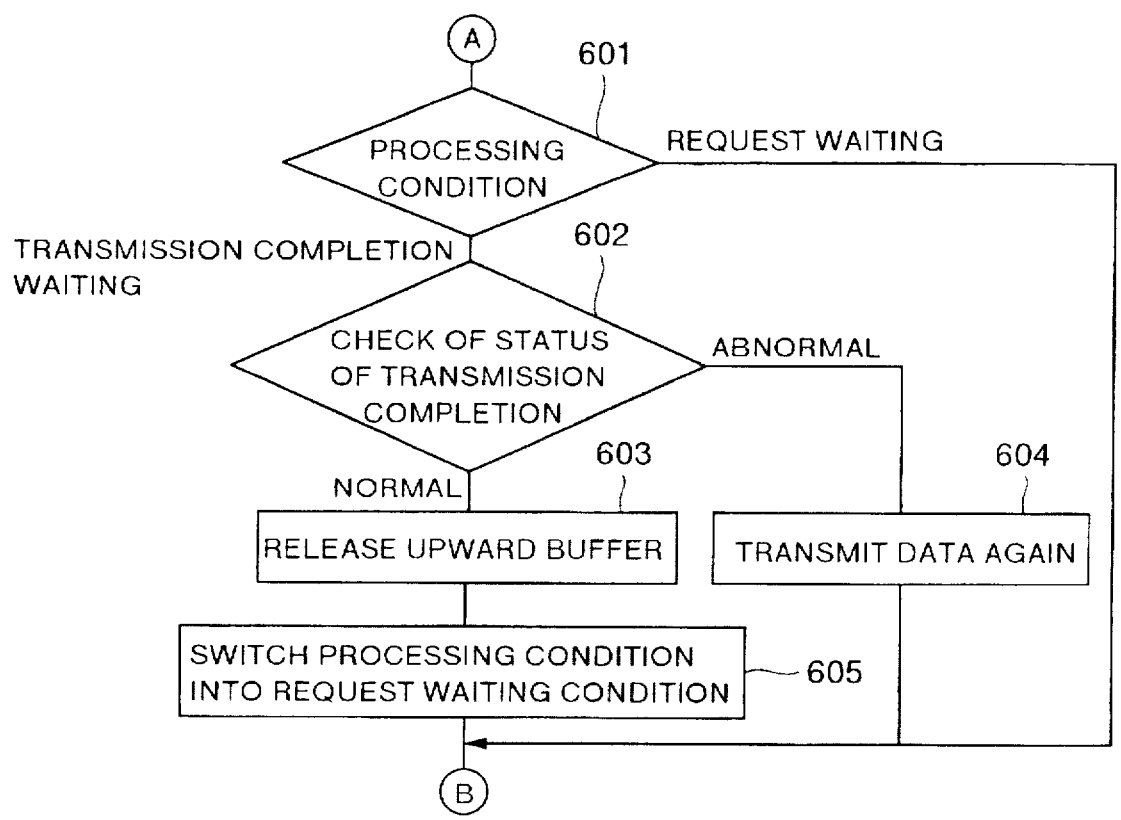

FIGS. 5 and 6 show as a whole a flow chart of a processing performed by the driver 302 for the LAN control circuit A.

When activated from the scheduler, the driver 302 for the LAN control circuit A judges whether or not a buffer request flag for the LAN control circuit A is set (step 501). In the case where the flag is set, the condition of vacancy of a downward buffer is confirmed (step 502). If there is a vacancy in the downward buffer, a buffer area is allotted to turn the buffer request flag off (step 503) and the pseudo carrier is turned into an OFF condition (step 504).

After the above processing is completed or in the case where it is determined in step 501 that the buffer request flag is not set or in the case where it is determined in step 502 that there is no vacancy in the downward buffer, the downward queue A 307 is searched (step 505). In the case where the downward queue A 307 has data queued therein, the type of that data is judged (step 506). If the queued data is transmit data which is to be transmitted to the LAN adaptor 110 and is queued in step 513 which will be mentioned later on, the flow goes to step 601 shown in FIG. 6. If the queued data is receive data received from the LAN adaptor 110, the status of reception is checked (step 507). In the case where the status of reception indicates that the reception is normal, the receive data is queued into the downward queue B 308 (step 508). Thereafter, the flow goes to step 510. In the case where the status of reception indicates that the reception is abnormal, there is released the buffer in which that data is stored (step 509). Thereafter, the flow goes to step 510.

In step 601, an internal processing condition is judged. The internal processing condition is a processing condition of the driver 302 itself which is held by the driver 302 for the LAN control circuit A. The internal processing condition includes a "request waiting condition" and a "transmission completion waiting condition". The "request waiting condition" means a state in which the driver 302 for the LAN control circuit A is waiting for data which is queued into the upward queue C 311 by the driver 305 for the LAN control circuit B and is to be transmitted to the LAN adaptor 110. The "transmission completion waiting condition" means a state in which the driver 302 for the LAN control circuit A is waiting for the completion of transmission of data by the LAN control circuit A 102 to the LAN adaptor 110. In the case where the internal processing condition is the request waiting condition, the flow goes to step 510. On the other hand, in the case where the internal processing condition is the transmission completion waiting condition, the status of transmission completion is checked (step 602). If the status of transmission completion indicates that the transmission completion is abnormal, the data is transmitted by the LAN control circuit A 102 to the LAN adaptor 110 again (step 604). Thereafter, the flow goes to step 510. If the status of transmission completion indicates that the transmission completion is normal, an upward buffer in which the data is stored is released (step 603) and the internal processing condition is changed into the request waiting condition (step 605). Thereafter, the flow goes to step 510.

When the above-mentioned processing in the downward direction is completed, the upward queue C 311 is searched (step 510). In the case where there is data in the upward queue C 311, the internal processing condition is checked (step 511). If the internal processing condition is a request waiting condition, the data is transmitted (step 512). The data is queued into the downward queue A 307 and the internal processing condition is switched into a transmission completion waiting condition (step 513), thereby completing this routine. In the case where there is no data in the upward queue C 311 or in the case where the internal processing condition is a transmission completion condition, this routine is completed at this point of time.

Figure 7:
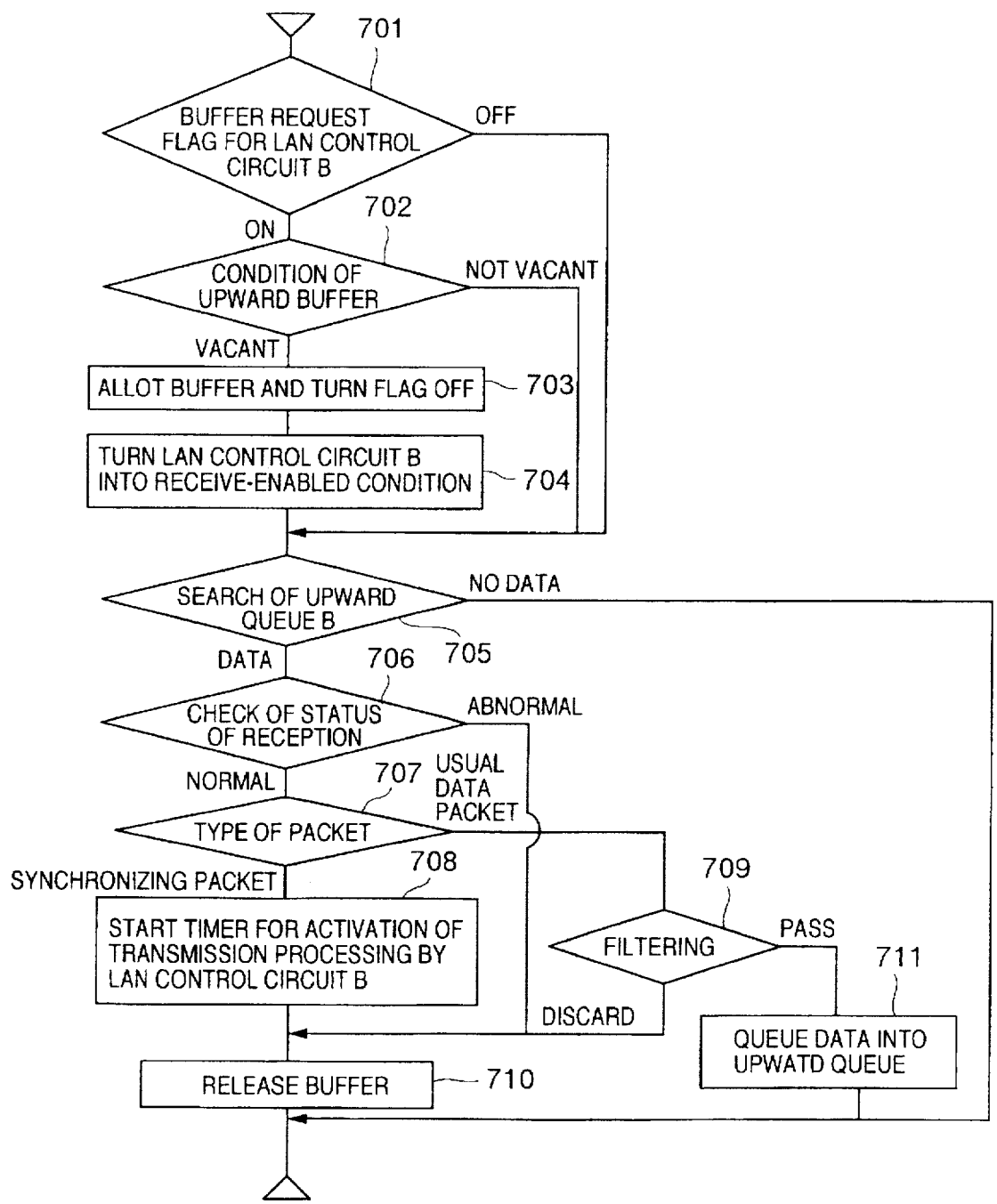
FIG. 7 is a flow chart showing a processing performed by a second LAN control driver.

FIG. 7 is a flow chart of a processing performed by the driver 305 for the LAN control circuit B.

When activated from the scheduler, the driver 305 for the LAN control circuit B judges whether or not a buffer request flag for the LAN control circuit B is set (step 701). In the case where the flag is set, the condition of vacancy of an upward buffer is confirmed (step 702). If there is a vacancy in the upward buffer, a buffer area is allotted to turn the buffer request flag into an OFF condition (step 703). Thereafter, the LAN control circuit B is turned into a receive-enabled condition (step 704).

After the above processing is completed or in the case where it is determined in step 701 that the buffer request flag is not set or in the case where it is determined in step 702 that there is no vacancy in the upward buffer, the upward queue B is searched (step 705). In the case where the upward queue B has no data queued therein, this routine is completed. In the case where the upward queue B has data queued therein, the status of reception is checked (step 706). In the case where the status of reception indicates that the reception is abnormal, there is released the buffer in which that data is stored (step 710). Thereby, this routine is completed. In the case where the status of reception indicates that the reception is normal, the type of a packet is judged (step 707). If the receive packet is a synchronizing packet for determining a data transmission period characteristic of each interface apparatus, a timer for activation of a transmission processing by the LAN control circuit B is started (step 708) and there is released the buffer in which that packet is stored (step 710). Thereby, this routine is completed. A time-out time of the transmission processing activation timer is different for each interface apparatus 101.

The synchronizing packet is outputted from an interface apparatus connected to one of computers included in the computer network, for example, an interface apparatus connected to a specified computer which has a chance of transmission at the beginning of each transmission cycle. In this case, the interface apparatus connected to the specified computer may generate the synchronizing packet periodically or the interface apparatus may generate the synchronizing packet upon detection of the completion of data transmission in the last period of each transmission cycle.

In the case where the receive data is a usual data packet (step 707), the filtering based on a socket port number is made (step 709). If the receive data is data to be relayed to the LAN adaptor, the data is queued into the upward queue C (step 711), thereby completing this routine. If there is no need to relay the receive data to the LAN adaptor, there is released the buffer in which the data packet is stored (step 710). Thereby, this routine is completed. The filtering made in step 709 will be mentioned later on.

Figure 8:
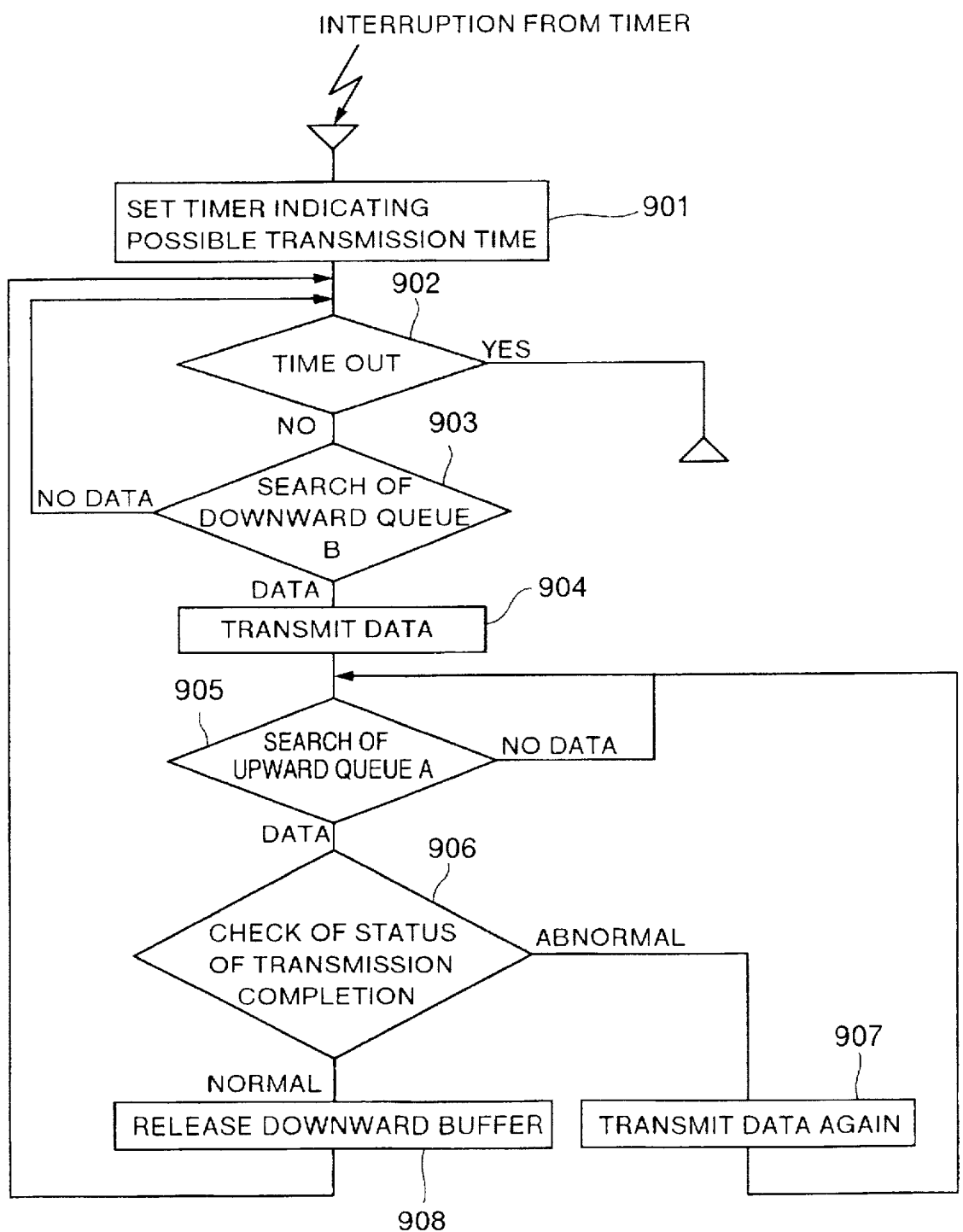
FIG. 8 is a flow chart showing a timer-activated transmission process for a second LAN control circuit.

FIG. 8 is a flow chart of the timer-activated transmission process 304 for the LAN control circuit B.

The transmission process 304 of the LAN control circuit B is activated by a time-out interruption from the transmission processing activation timer activated at the time of reception of the synchronizing packet. In this routine, a timer indicating a possible transmission time of the LAN control circuit B itself is first set (step 901). The transmission processing is repeated until the timer takes time out or the time set by this timer is over (step 902). More particularly, the downward queue B 308 is searched (step 903). If the downward queue B 308 has data queued therein, the LAN control circuit B 103 is activated to transmit the data (step 904). After the activation of the LAN control circuit B 103, the search of the upward queue A 309 (step 905) is repeated to wait for the status of transmission completion to be set into the upward queue A 309. When the status of transmission completion is set into the upward queue A 309, the content thereof is checked (step 906). In the case where the transmission completion is abnormal, the data is transmitted again (step 907) so that the search of the upward queue A 309 is repeated again. In the case where the transmission completion is normal, there is released a downward buffer in which transmit data is stored (step 908). Thereafter, the flow returns to step 902 to repeat the above-mentioned data transmission operation until the timer indicating the possible transmission time takes time out.

Figure 9:
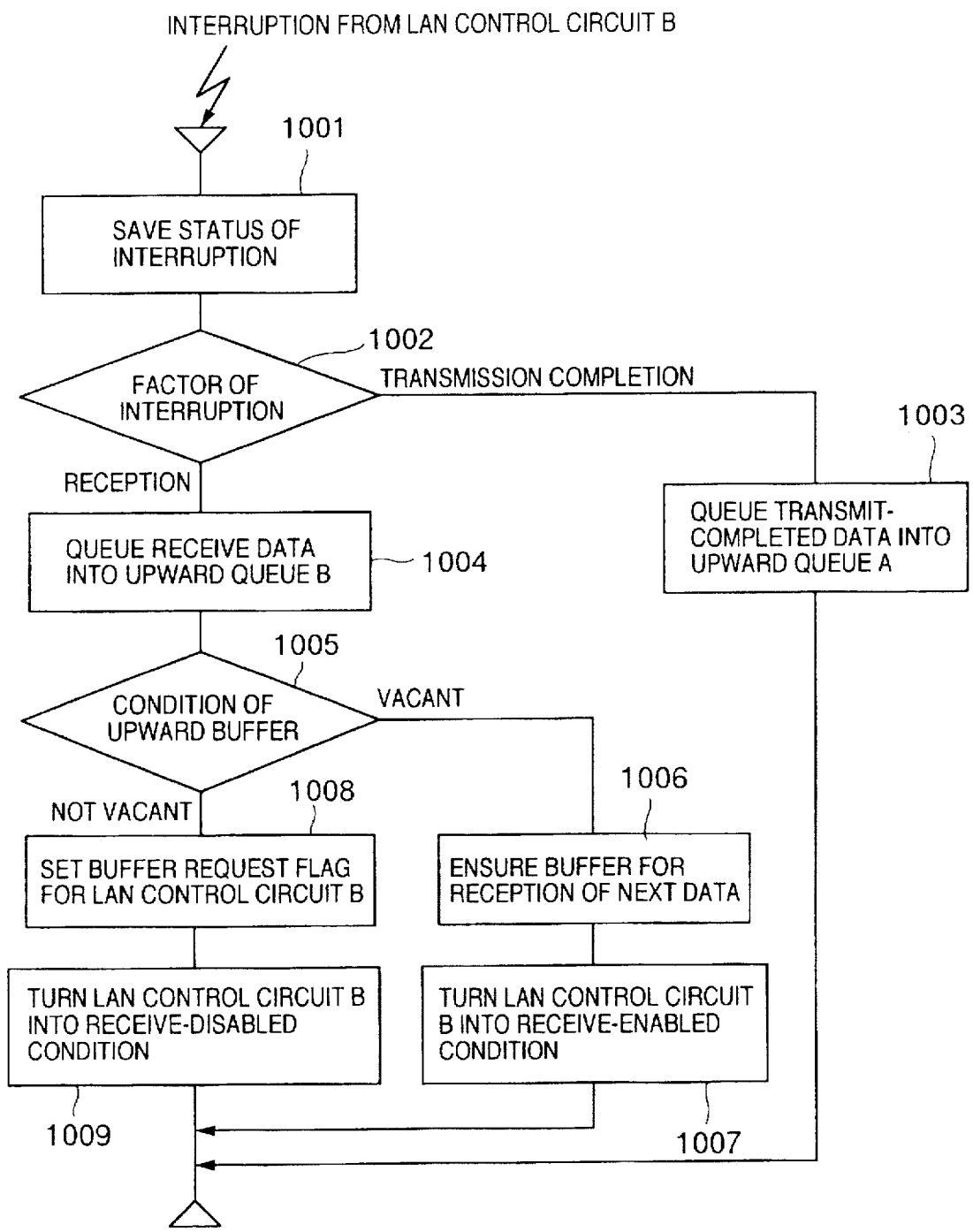
FIG. 9 is a flow chart showing a processing performed by a module which processes an interruption from the second LAN control circuit.

FIG. 9 is a flow chart of a processing performed by the interrupt module 303 for the LAN control circuit B.

When there is an interruption from the the LAN control circuit B 103, the status of interruption is saved (step 1001)

to judge a factor of interruption (step 1002). In the case of an interruption indicating the completion of transmission to the Ethernet transmission line, transmit-completed data is queued into the upward queue A 309 (step 1003), thereby completing this routine. In the case of a receiving interruption, receive data is queued into the upward queue B 310 (step 1004) and the condition of vacancy of an upward buffer is thereafter checked in preparation for reception of the next data (step 1005). If there is a vacancy in the upward buffer, a buffer area for reception is ensured (step 1006) and the LAN control circuit B 103 is turned into a receive-enabled condition (step 1007), thereby completing this routine. In the case where there is much traffic in the upward direction so that the upward buffer has no vacancy, a buffer request flag for the LAN control circuit B 103 is turned on (step 1008) and the LAN control circuit B 103 is turned into a receive-disabled condition (step 1009), thereby completing this routine.

Next, the filtering of receive data by the network interface apparatus 101 will be explained.

Figure 10:
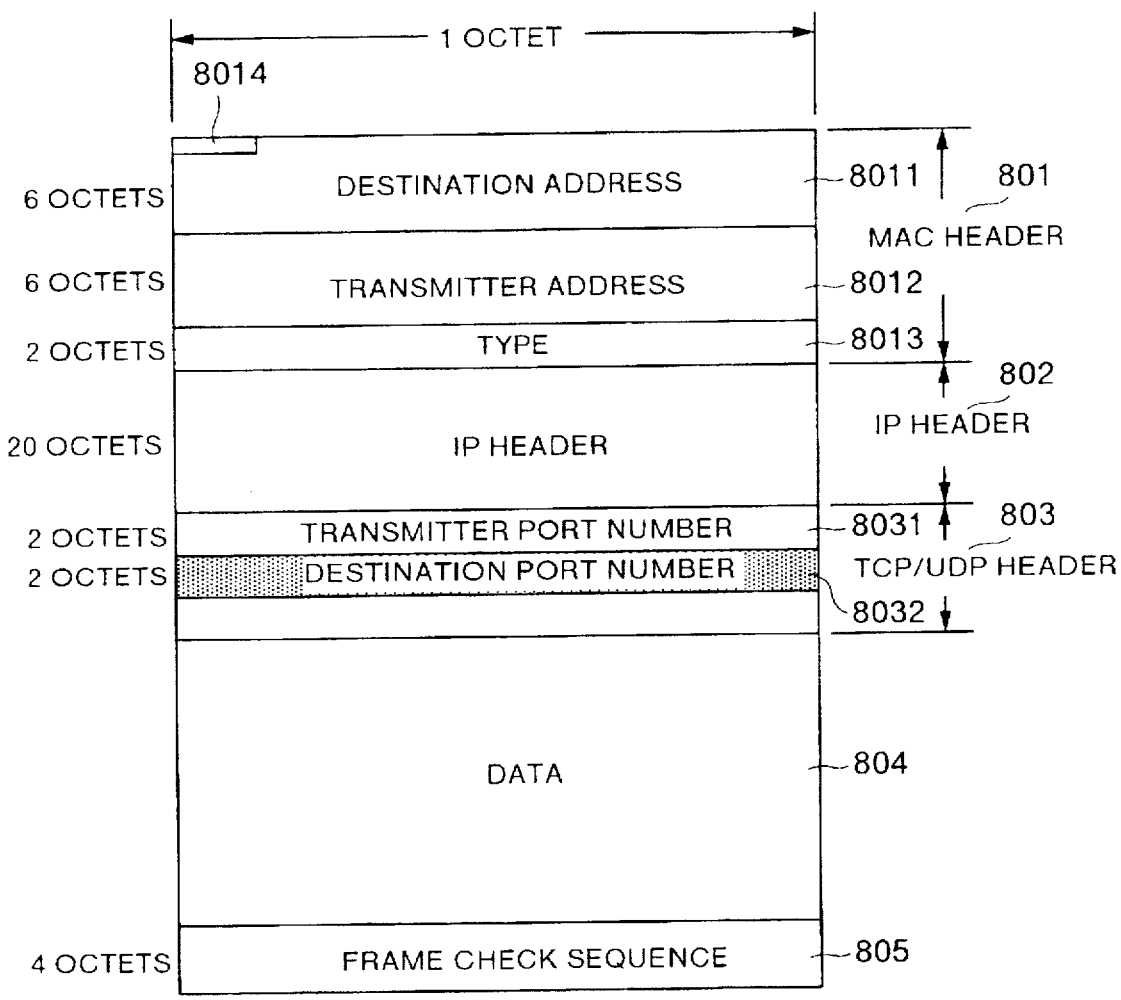
FIG. 10 is a diagram showing the format of an Ethernet frame.

FIG. 10 is a format diagram in which a frame format on the Ethernet is logically shown. The Ethernet frame is composed of an MAC header 801, an IP header 802, a TCP/UDP header 803, a data portion 804, and a frame check sequence 805. The MAC header 801 includes a destination address 8011, a transmitter address 8012 and a type portion 8013. The first bit of the destination address 8011 is used as a broadcast bit. A data packet having the set broadcast bit 8011 is transmitted on the Ethernet transmission line 113 with all computers in the system made an object or without specifying a computer which receives that data packet. There may be the case where a plurality of kinds of protocols such as a TCP/IP system, an IP/X system or the like coexist on the Ethernet as a frame to be transmitted. In the type portion 8013 is set information which represents a protocol type used for the transmission/reception of that data packet. The TCP/UDP header 803 includes a transmitter port number 8031 and a designation port number 8032. In the present embodiment, a port number set as the designation port number 8032 and a protocol type set in the type portion 8013 are used as information which provides a reference for the filtering.

Figure 11:
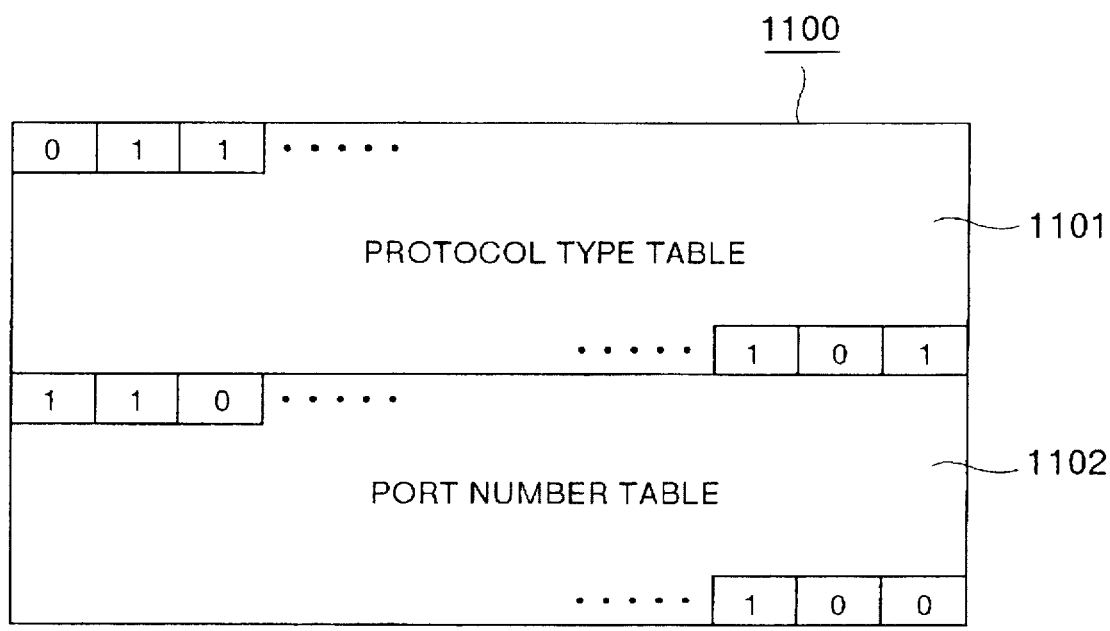
FIG. 11 is a diagram showing the construction of a filtering parameter table.

FIG. 11 is a diagram showing the construction of a filtering parameter table which is stored in the program memory 106. As shown in FIG. 11, the filtering parameter table 1100 is constructed by a bit map and includes a protocol type table 1101 and a port number table 1102. Each bit of the protocol type table 1101 corresponds to the type of a communication protocol used in the relevant network system, and "1" is set for a bit corresponding to the protocol type of a receive packet which should be relayed to the LAN adaptor 110 of a computer. Also, each bit of the port number table 1102 corresponds to a port number used in the relevant network system, and "1" is set for a bit corresponding to the port number of a receive packet which should be relayed to the LAN adaptor 110 of a computer. The setting of information into the filtering parameter table is made, for example, as follows. In accordance with a command inputted from a terminal device (not shown) provided in the computer 109, information designating protocol types and port numbers to be registered are transferred from the computer 109 to the network interface apparatus 101. In the network interface apparatus 101, each bit of the filtering parameter table is set in accordance with the information transferred from the computer 109. The information transferred from the computer 109 in accordance with the command input is stored beforehand into a memory such as disk device (not shown) which is possessed by the computer 109.

Figure 12:
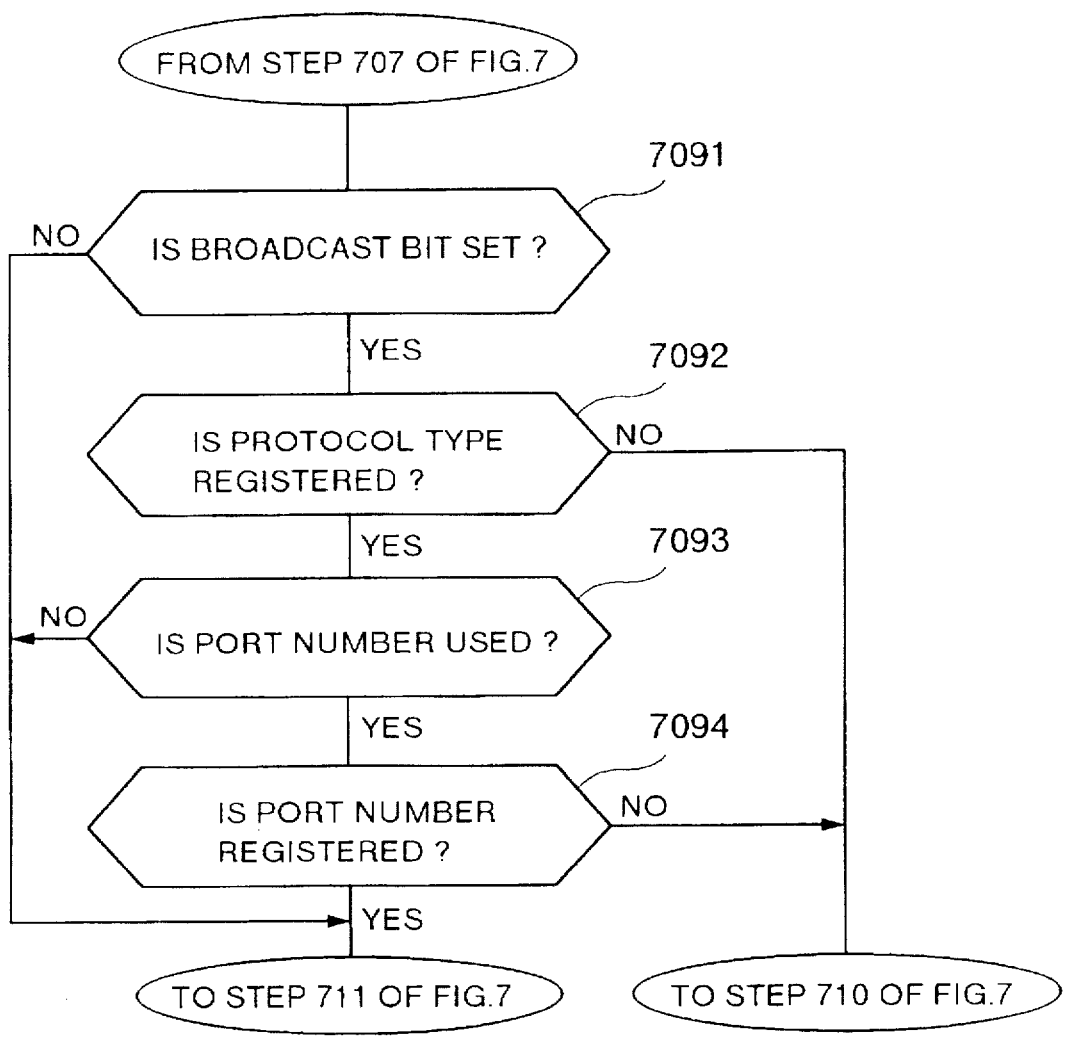
FIG. 12 is a flow chart showing the flow of a filtering process.

FIG. 12 is a flow chart of the filtering process performed in step 709 shown in FIG. 7. In the filtering process, the judgement is first made of whether or not the broadcast bit 8014 of the destination address 8011 of the MAC header 801 is set (step 7091). If the destination address is a broadcast address, the judgement is made of a protocol type set in the type portion 8013 (step 7092). In step 7092, the reference to the protocol table 1101 is made to check whether or not a bit corresponding to the protocol type set in the type portion 8013 is set. In the case where the corresponding bit is set, the judgement is made of whether or not that protocol type uses a port number (step 7093). If the protocol type does not use a port number, the flow goes to step 711 shown in FIG. 7. If the protocol type uses a port number, the reference to the port number table 1102 is made to judge whether or not a bit corresponding to a port number set in the destination port number 8023 is set (step 7094). In the case where the corresponding bit is set, the flow goes to step 711 shown in FIG. 7. In the case where the result of judgement in step 7092 or 7094 is negative, the flow goes to step 710 of FIG. 7 in which the receive packet is rejected and the buffer is released.

In the present embodiment, both the port number and the protocol type are used as information for filtering and are subjected to the judgement. However, the filtering may be made using only one of the port number and the protocol type.

Figure 13:
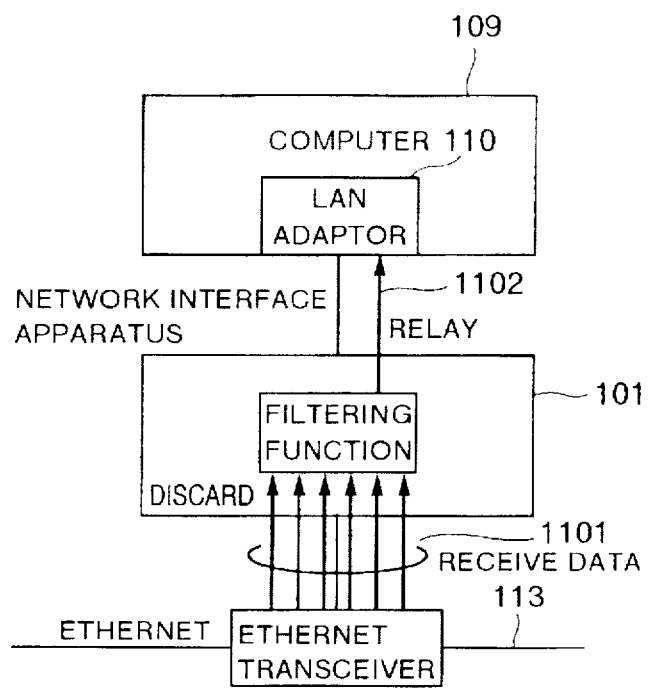
FIG. 13 is a data flow diagram for explaining a broadcast data filtering function.

FIG. 13 shows an example of a data transmission operation in the case where an upward filtering function is effected.

Receive data received from the Ethernet transmission line 113 to the network interface apparatus 101 through the transceiver 112 is subjected to the above-mentioned filtering process by the filtering function of the network interface apparatus 101. In the shown example, the receive data includes six data and is designated by reference numeral 1102. Data having no need to be relayed to the computer 109 through the LAN adaptor 110 is subjected to a discard processing by the network interface apparatus and only data to be relayed (arrow 1102 in FIG. 13) is transferred to the LAN adaptor 110. If the network interface apparatus is not provided with the filtering function, the computer side is required to perform a reception processing six times for the six data. In the present embodiment, however, once suffices for the reception processing.

Figure 14:
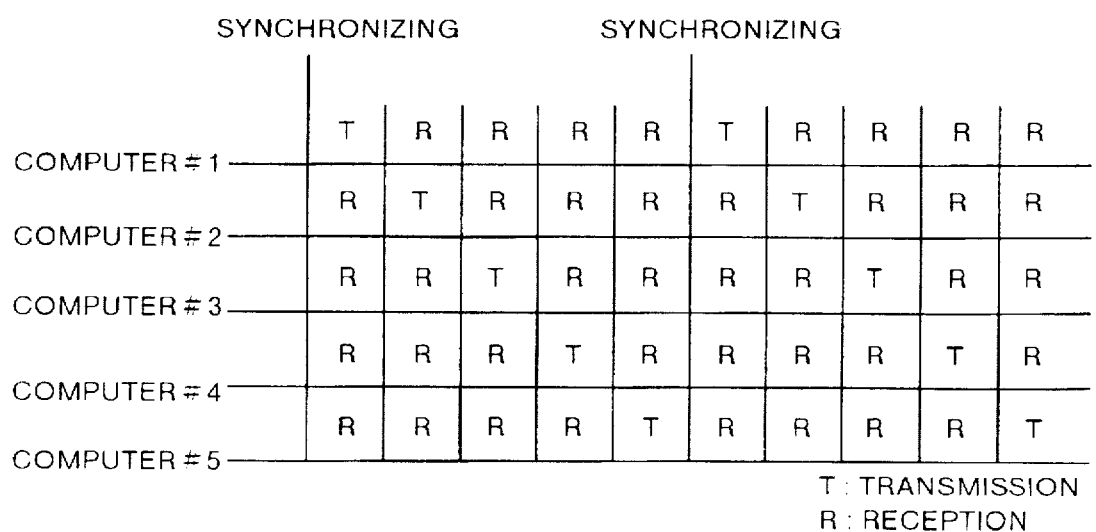
FIG. 14 is a time chart for explaining an example of a scheduling for transmission control.

FIG. 14 shows an example in the case where a downward transmission control function is effected.

In the present example, it is assumed that five computers #1 to #5 are connected to the network and are communicating with each other. After the reception of a synchronizing packet, each of the computers #1 to #5 performs data transmission on the basis of a transmission waiting time predetermined for that computer. In the present example, when the synchronizing packet is received, the computer #1 first starts a transmission operation. During a period of time when the computer #1 is performing the transmission operation, the other computers #2 to #5 perform only reception operations. When the data transmission time of the computer #1 is over, the computer #2 performs a transmission operation and the other computers #1, #3, #4 and #5 perform reception operations.

Thus, a transmission/reception control is performed with the synchronizing packet as a momentum or starting point in such a manner that data transmission periods are successively allotted to the computers with phases shifted from each other. With such a control, in the case where the processing performance of a computer is high as compared with the network transmission rate (or band), it is possible to avoid a situation in which the occupation of the network band by one computer makes the transmission by the other computers inoperative and to avoid the collision of data on the transmission line or a protocol processing, thereby enabling the structuring of a system in which the maximum data delay is predictable.

Figure 15:
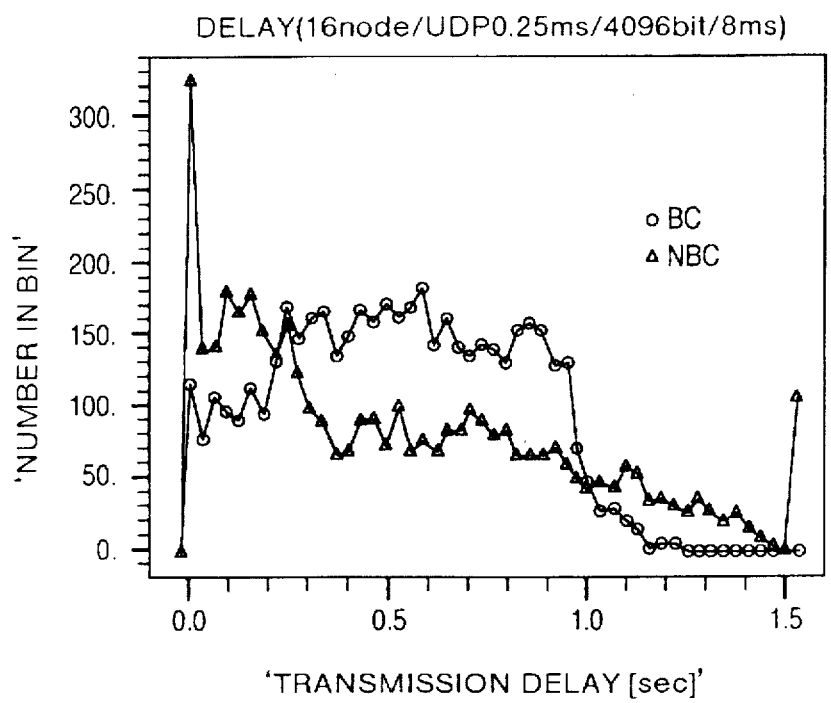
FIG. 15 is a graph showing the effect of a transmission control concerning data delay.

FIG. 15 shows one example of the effect of the transmission control of the present embodiment concerning data delay or the result of evaluation of data transmission delay upon high load by a network simulator.

A used condition is such that a network is an Ethernet having a transmission rate of 10 Mbps, the number of computers is 16, a protocol processing time is 250 micoseconds, a data length is 512 bytes, the frequency of data generation in each computer is once per 8 ms and a synchronizing packet period is 1 second.

Circle symbols represent a data transmission delay time distribution in the case where the transmission control is performed, and triangle symbols represent such a distribution in the case where the transmission control is not performed. It is apparent from FIG. 15 that in the case where the transmission control is performed, the delay time of all data falls within about 1.2 seconds whereas in the case where the transmission control is not performed, data taking a delay time equal to or more than 1.5 seconds include 100 or more data (or corresponds to about 3% of the whole data).

Figure 16:
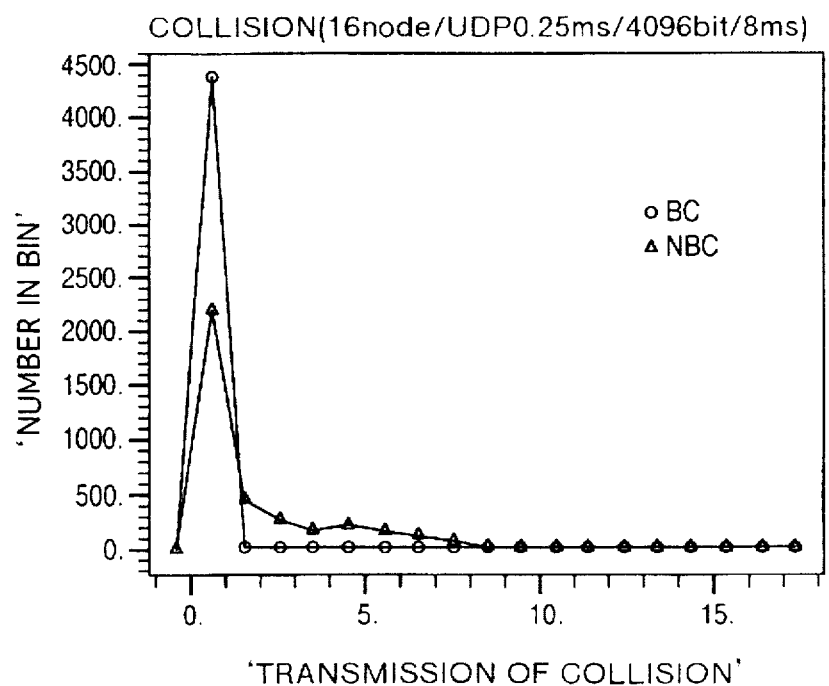
FIG. 16 is a graph showing the effect of the transmission control concerning data collision.

FIG. 16 shows the effect of the transmission control of the present embodiment concerning the collision of data or the result of evaluation of the number of times of data collision on the Ethernet transmission line made by the network simulator under a condition similar to that in the case of FIG. 15.

In the case where the transmission control is performed, the collision on the transmission line is not generated at all. However, in the case where the transmission control is not performed, about the half of the whole data collide with each other on the transmission line and hence a re-transmission operation is required.

In the foregoing embodiment, a socket port number and/or a protocol type are used as means for filtering upward data. However, the present invention is not limited to such example.

When considering the fact that a user program has no direct relation to the socket port number or the protocol and each user program has a relation to an identification code which is used in each application and is characteristic of that application, the feature of the present invention of the transfer of a load for a user program processing to a network interface apparatus may be realized, for example, in such a manner that the identification code characteristic of each application is applied as a reference for filtering.

As apparent from the foregoing explanation, in the present invention, a predetermined transmission time limit is given to each computer connected to Ethernet, thereby making it possible to provide a network system in which the collision of data on a transmission line is avoided and a predetermined upper limit value is ensured for a data transmission delay time.

Also, unnecessary data is discarded on the network interface side in each computer, thereby making it possible to prevent a wasteful receiving interruption, for example, for broadcast data frequently used in the field of a computer control system. Further, it is possible to effectively allot the processing performance of each computer to a usual work processing while making the best use of a merit of broadcast that a transmitting device completes the transmission of data to all computers through a transmission processing performed once.

We claim:

1. A network interface apparatus for connecting a LAN adaptor which a computer possesses and a transceiver which is provided on an Ehternet transmission line, comprising:
   first control means for making the transmission and reception of an Ethernet frame to and from said LAN adaptor;
   second control means for making the transmission and reception of the Ethernet frame to and from said transceiver;
   filtering means for discarding unnecessary data of receive data received from said transceiver by said second control means to selectively relay the receive data to said LAN adaptor through said first control means;
   a buffer memory for temporarily storing transmit data; and
   transmission control means for causing said buffer memory to temporarily store transmit data received from said LAN adaptor by said first control means and transmitting the transmit data to said transceiver through said second control means in a transmission time zone allotted beforehand.

2. A network interface apparatus according to claim 1, further comprising means for generating a control signal indicative of the suppression and release of data transmission to said LAN adaptor in accordance with the condition of the vacant area of said buffer memory.

3. A network interface apparatus according to claim 2, wherein when the vacant area of said buffer memory becomes equal to or smaller than a predetermined threshold, said control signal generating means generates a pseudo carrier equivalent to a carrier which is outputted by said transceiver when said Ethernet transmission line is busy, said pseudo carrier being turned off when the vacant area of said buffer memory exceeds said predetermined threshold.

4. A network interface apparatus according to claim 1, wherein said filtering means selects the data from said transceiver to be relayed on the basis of a socket port number which is included in the receive data.

5. A network interface apparatus according to claim 1, wherein said filtering means selects the receive data from said transceiver to be relayed on the basis of a specific identification number which is included in the receive data and is used by an application program.

6. A network interface apparatus according to claim 1, wherein said filtering means selects the receive data from said transceiver to be relayed on the basis of information set in a type field which is included in an Ethernet header of the receive data.

7. A network interface apparatus according to claim 1, wherein said transmission control means sets a transmission time zone for the transmit data temporarily stored in said buffer memory to a time zone for which predetermined synchronizing data received from a network for each transmission cycle is taken as a starting point and which is characteristic of the network interface apparatus itself.

8. A network interface apparatus which is applied to a network system including a plurality of computers making the transfer of data through a network and which is connected between each of said plurality of computers and said network, comprising:
   a buffer memory;
   first transmission control means for receiving transmit data transmitted from said computer to said network to store the transmit data into said buffer memory;
   reception control means for relaying receive data received from said network to said computer;
   means for determining the timing of transmission of the transmit data stored in said buffer memory to said network on the basis of the reception of a synchronizing packet transferred on said network and indicating a synchronous timing which controls a timing for making the transmission of data to said network; and second transmission control means for transmitting the transmit data stored in said buffer memory in accordance with the timing determined by said determining means.

9. A network interface apparatus according to claim 8, further comprising busy signal generating means for monitoring the size of an available vacant area in said buffer memory and delivering a busy signal to said computer when the size of said vacant area becomes equal to or smaller than a threshold.

10. A network interface apparatus according to claim 9, wherein said busy signal generating means generates as said busy signal a pseudo carrier equivalent to a carrier which is transferred together with data during a period of time when the data is transferred on said network.

11. A network interface apparatus according to claim 8, wherein said determining means includes a first timer which is activated in accordance with the reception of said synchronizing packet and a second timer which is activated in accordance with time-out of said first timer.

12. A network interface apparatus according to claim 11, wherein said second transmission control means is activated in accordance with time-out of said first timer and performs the transmission of the transmit data to said network until said second timer takes time out.

13. A network interface apparatus according to claim 8, wherein said network is Ethernet, and said reception control means makes, the judgement of whether or not the receive data received from said Ethernet is to be relayed to said computer, on the basis of a socket port number included in the receive data and relays to said computer only the receive data which is judged as being to be relayed to said computer.

14. A network interface apparatus according to claim 13, wherein said reception control means includes a port number table in which a socket port number included in data to be relayed to said computer is registered.

15. A network interface apparatus according to claim 8, wherein said network is Ethernet, and said reception control means makes, the judgement of whether or not the receive data received from said Ethernet is to be relayed to said computer, on the basis of information representing a protocol type included in the receive data and relays to said computer only the receive data which is judged as being to be relayed to said computer.

16. A network interface apparatus according to claim 15, wherein said reception control means includes a port number table in which the protocol type of data to be relayed to said computer is registered.

17. A data transmission control method performed by a network interface apparatus in a network system which includes an Ethernet transmission line and a plurality of nodes each having a computer, a transceiver provided on said Ethernet transmission line, and said network interface apparatus connected between said transceiver and a LAN adaptor possessed by said computer, comprising:

a step of receiving transmit data transmitted from the LAN adaptor of the corresponding computer to store it into a buffer memory;

a step of determining a transmission time zone for the transmit data stored in said buffer memory on the basis of a synchronizing packet transferred on said Ethernet transmission line; and a step of transmitting the transmit data stored in said buffer memory to said transceiver in the determined transmission time zone.

18. A data transmission control method according to claim 17, further comprising a step of receiving, from said transceiver, data which is transferred on said Ethernet transmission line, and a step of selectively relaying the received data to said LAN adaptor.

19. A data transmission control method according to claim 18, wherein said relaying step includes a step of judging whether or not a socket port number included in the received data is a socket port number registered beforehand, and a step of relaying the received data to said LAN adaptor when it is determined in said judging step that the socket port number included in the received data is the registered socket port number.

20. A data transmission control method according to claim 18, wherein said relaying step includes a step of judging whether or not a protocol represented by type information representative of a protocol for communication included in the received data is a protocol registered beforehand, and a step of relaying the received data to said LAN adaptor when it is determined in said judging step that the type information included in the received data is the registered protocol.

21. A data transmission control method according to claim 17, further comprising a step of monitoring the size of a vacant area of said buffer memory, and a step of transmitting a signal representative of a busy condition to said LAN adaptor in accordance with the result of said monitoring step which indicates that the size of the vacant area of said buffer memory becomes equal to or smaller than a predetermined size.

22. A data transmission control method according to claim 21, wherein said signal transmitting step transmits as said signal a pseudo carrier equivalent to a carrier which is used when data is transferred on said Ethernet transmission line.

23. A data transmission control method according to claim 17, further comprising a step of periodically transmitting said synchronizing packet by the network interface apparatus provided in one of said plurality of nodes.

24. A data transmission control method performed by a network interface apparatus in a network system which includes an Ethernet transmission line and a plurality of nodes each having a computer for performing a predetermined processing, a transceiver provided on said Ethernet transmission line, and said network interface apparatus connected between said transceiver and a LAN adaptor possessed by said computer, comprising:

a step of receiving, from said transceiver, data which is transferred on said Ethernet transmission line; and a step of selectively relaying the received data to said LAN adaptor.

25. A data transmission control method according to claim 24, wherein said relaying step includes a step of judging whether or not a socket port number included in the received data is a socket port number registered beforehand, and a step of relaying the received data to said LAN adaptor when it is determined in said judging step that the socket port number included in the received data is the registered socket port number.

26. A data transmission control method according to claim 24, wherein said relaying step includes a step of judging whether or not a protocol represented by type information representative of a protocol for communication included in the received data is a protocol registered beforehand, and a step of relaying the received data to said LAN adaptor when it is determined in said judging step that the type information included in the received data is the registered protocol.

* * * * *